(12) United States Patent
Kinamon et al.

(10) Patent No.: US 9,500,737 B2
(45) Date of Patent: Nov. 22, 2016

(54) METHODS AND SYSTEMS FOR ESTIMATING LOCATION OF A WIRELESS CLIENT DEVICE

(71) Applicant: GoNet Systems, Ltd., Tel Aviv (IL)

(72) Inventors: Roy Kinamon, Tel Aviv (IL); Moshe Salhov, Herzeliya (IL); Gal Zuckerman, Holon (IL); Oz Liv, Tel Avia (IL)

(*) Notice: Subject to any disclaimer, the term of this patent is extended or adjusted under 35 U.S.C. 154(b) by 0 days.

(21) Appl. No.: 14/627,123

(22) Filed: Feb. 20, 2015

(65) Prior Publication Data

US 2015/0241549 A1  Aug. 27, 2015

Related U.S. Application Data

(60) Provisional application No. 61/945,508, filed on Feb. 27, 2014.

(51) Int. Cl.
  *H04W 24/00* (2009.01)
  *G01S 5/02* (2010.01)
(52) U.S. Cl.
  CPC .................. *G01S 5/0252* (2013.01)

(58) Field of Classification Search
  CPC ........................................ G01S 5/0252
  USPC ....................................... 455/456.1
  See application file for complete search history.

(56) References Cited

U.S. PATENT DOCUMENTS

| 2009/0232063 | A1 | 9/2009 | Cordeiro et al. |
| 2011/0175780 | A1 | 7/2011 | Gatti et al. |
| 2012/0040653 | A1* | 2/2012 | Mendis ............... G01S 5/0252 455/414.2 |
| 2014/0029461 | A1 | 1/2014 | Kinamon et al. |
| 2014/0029599 | A1 | 1/2014 | Kinamon et al. |
| 2014/0369321 | A1* | 12/2014 | Tan .................... H04W 56/001 370/336 |

* cited by examiner

*Primary Examiner* — Tanmay Shah
(74) *Attorney, Agent, or Firm* — Intrinsic Law Corp.

(57) ABSTRACT

Methods and systems for estimating location of a wireless client device are disclosed. In some aspects, a receiver detects a plurality of wireless communication signals from a wireless client device using a plurality of receiver antennas, matches a received signal signature with one of a plurality of stored signatures, and estimates a location of the transmitting client device based on said match.

11 Claims, 9 Drawing Sheets

METHODS AND SYSTEMS FOR ESTIMATING LOCATION OF A WIRELESS CLIENT DEVICE

RELATED APPLICATIONS

The present application is related to and claims priority under 35 USC §120 to U.S. Provisional Application No. 61/945,508 filed on Feb. 27, 2014, bearing the present title, which is hereby incorporated by reference.

TECHNICAL FIELD

The present application relates to the field of wireless communication. More specifically, it relates to wireless communication systems and methods related to estimation of a location of client devices in such contexts.

BACKGROUND

Typical systems and methods for estimating location of wireless client devices are based on channel estimation, and are therefore sensitive to changing conditions. It is therefore desirable to have systems and methods that can better estimate the location of a client wireless communication device even under such dynamic conditions or environments.

Prior systems are generally incapable of estimating a source of a wireless client device. Other systems are not able to accurately or efficiently make such an estimation.

SUMMARY

An embodiment is directed to a system and method for estimating a location of a wireless client device includes receiving, via at least a first and a second receive antenna configuration of a first receiver, respectively, at least a first and a second wireless signal associated with at least one transmission transmitted by a wireless client device from a first location determining a first signature that includes at least a first and a second received-signal-strength-indication associated respectively with said at least first and second wireless signal; matching said first signature with at least one recorded signature taken from a bank of recorded signatures previously obtained via said at least first and second receive antenna configuration in conjunction with previous transmissions transmitted from known locations; and estimating said first location, using at least one of said known locations that is associated, in said bank, with said at least one recorded signature.

Another embodiment is directed to a system and method for populating a bank of recorded signatures includes receiving, from each of plurality of known locations, via at least a first and a second receive antenna configuration, respectively, at least a first location-specific and a second location-specific wireless signal associated with said known location; determining, for each of said known locations, a location-specific signature that includes at least a first location-specific and a second location-specific received-signal-strength-indication associated respectively with said at least first location-specific and second location-specific wireless signal; and recording, in said bank, for each of said known locations, said location-specific signature associated therewith.

IN THE DRAWINGS

The embodiments are herein described by way of example only and with reference to the accompanying drawings in which.

DETAILED DESCRIPTION

Figure 1:
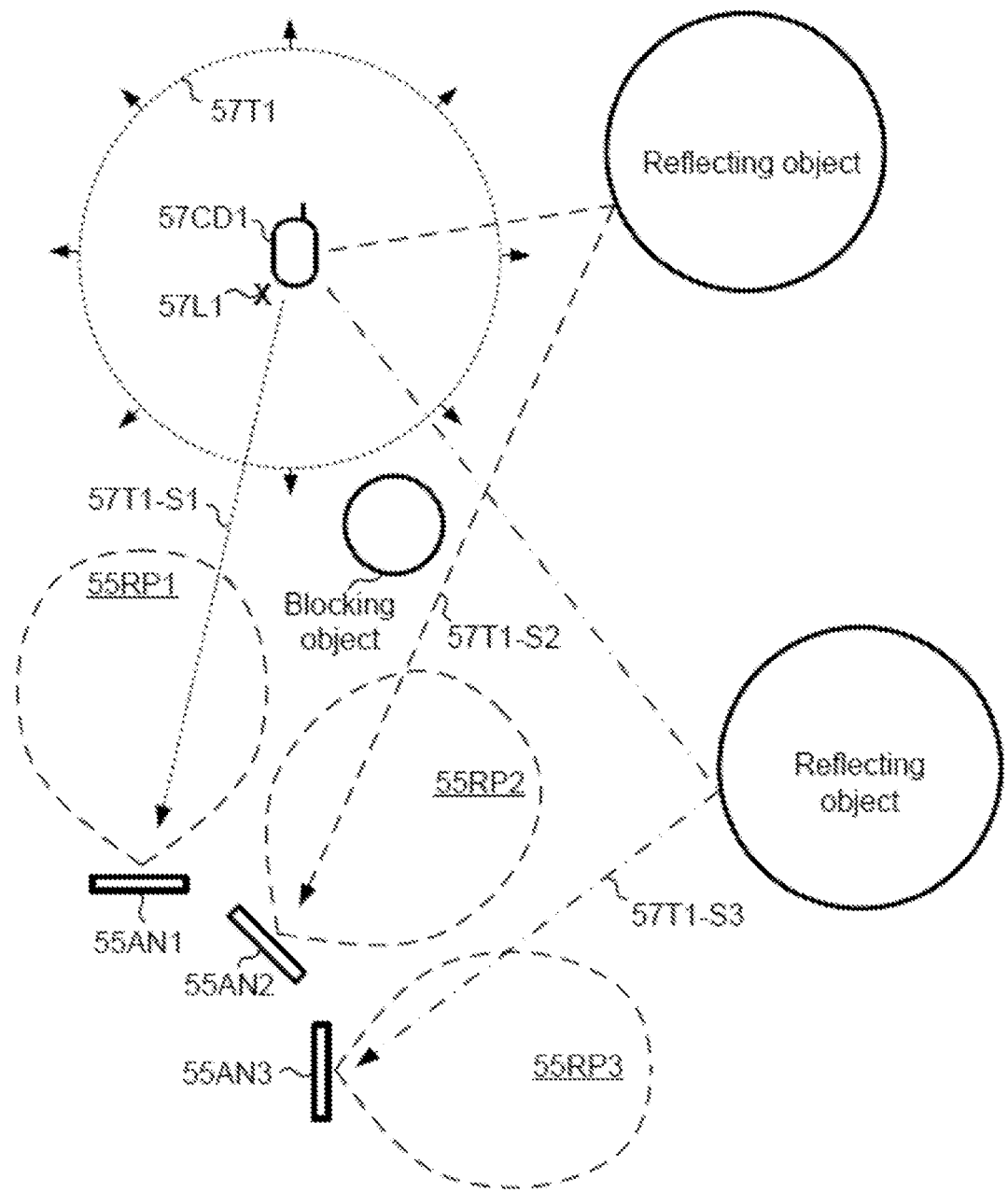
FIG. 1 illustrates one embodiment of a system including a first, a second, and a third receive antenna configuration, having respectively a first, a second, and a third radiation pattern, receiving wireless signals from a wireless client device located at a first location.

FIG. 1 illustrates an embodiment of a system including an antenna configuration having a first receive antenna 55AN1, a second receive antenna 55AN2, and a third receive antenna 55AN3 configuration, and having respectively a first radiation pattern 55RP1, a second radiation pattern 55RP2, and a third radiation pattern 55RP3. The receiving antennas 55AN1, 55AN2, 55AN3 receive direct (e.g., 57T1-S1) and/or indirect (e.g., 57T1-S2, 57T1-S3) signals over the air, which are transmitted from the wireless client device 57CD1 located at a first location 57L1 and which may be reflected or scattered by one or more reflecting or blocking objects.

Figure 2:
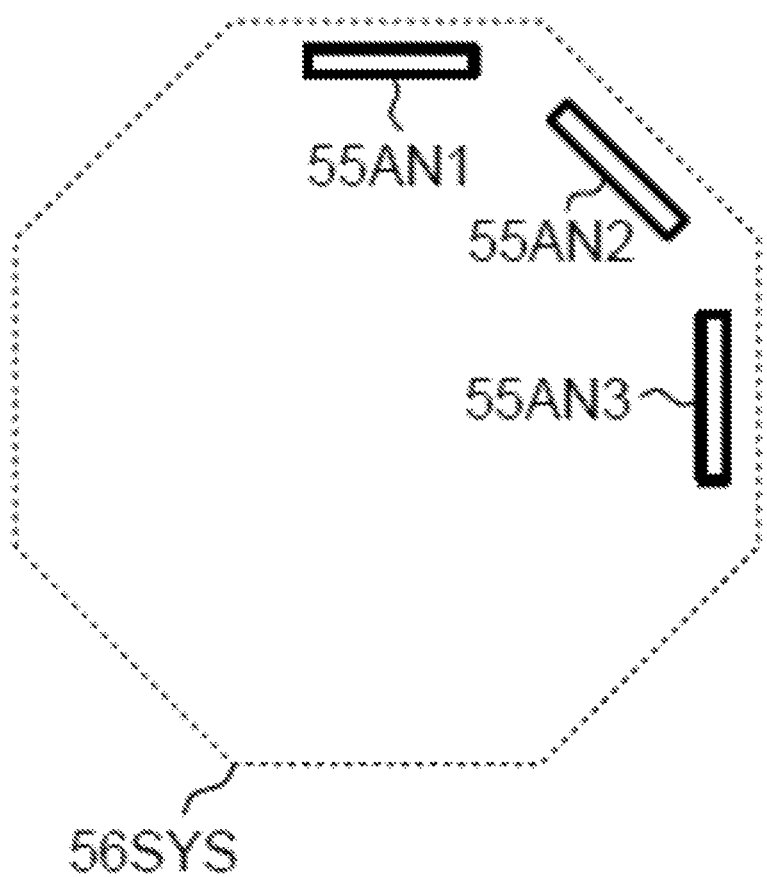
FIG. 2 illustrates one embodiment of a receiver including the first, second, and third receive antenna configuration.

FIG. 2 illustrates an embodiment of a receiver 56SYS including the first receive antenna 55AN1, second receive antenna 55AN2, and third receive antenna 55AN3 configuration. Those skilled in the art will appreciate that the shown configurations are illustrative and exemplary and that numerous other configurations are possible without departing from the scope of the present disclosure. Also, the present disclosure is directed to radiation and transmission-reception in three dimensions as well as in two dimensions without loss of generality.

Figure 3:
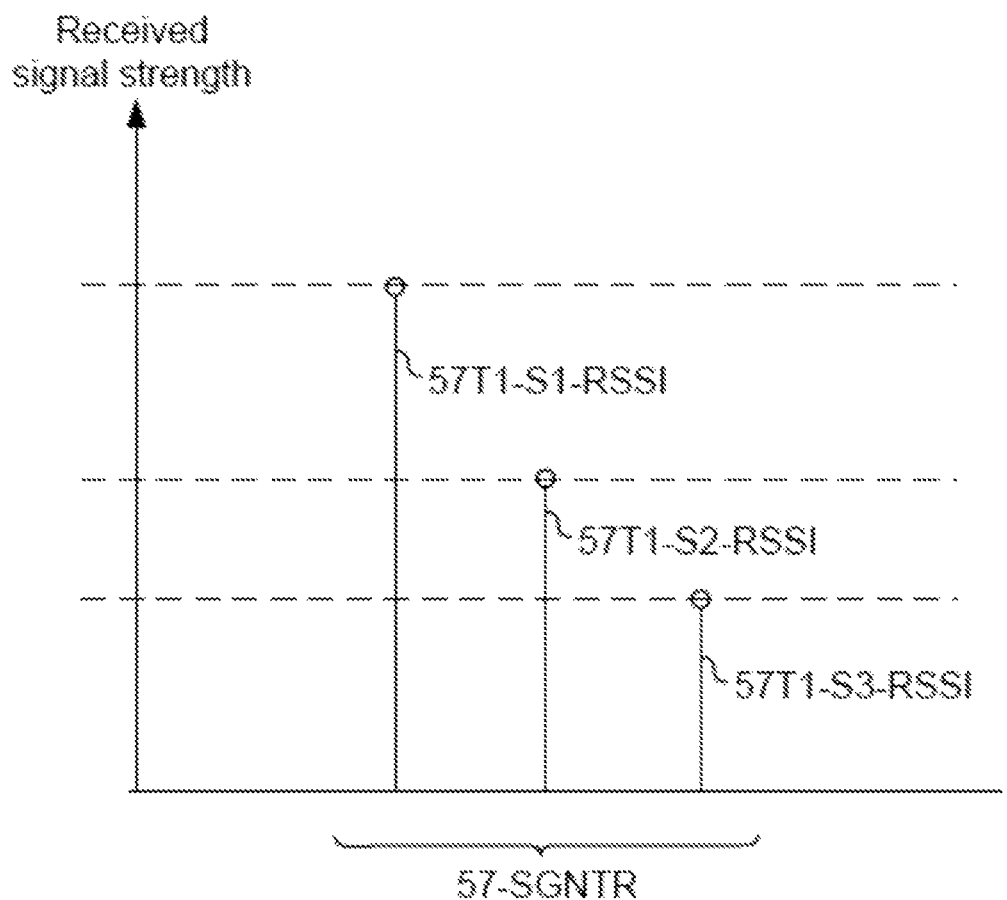
FIG. 3 illustrates one embodiment of a signature that includes received-signal-strength indications associated with wireless signals received from the wireless client device located at the first location.

FIG. 3 illustrates an embodiment of a signal signature 57-SGNTR that includes received-signal-strength indications 57T1-S1-RSSI, 57T1-S2-RSSI, 57T1-S3-RSSI associated respectively with wireless signals 57T1-S1, 57T1-S2, 57T1-S3 (FIG. 1) received from the wireless client device 57CD1 (FIG. 1) located at the first location 57L1 (FIG. 1). By way of example, the received signal strength from signal 57T1-S1 may be greater if it is received directly than would be scattered, blocked or reflected signals 57T1-S2, 57T1-S3.

Figure 4:
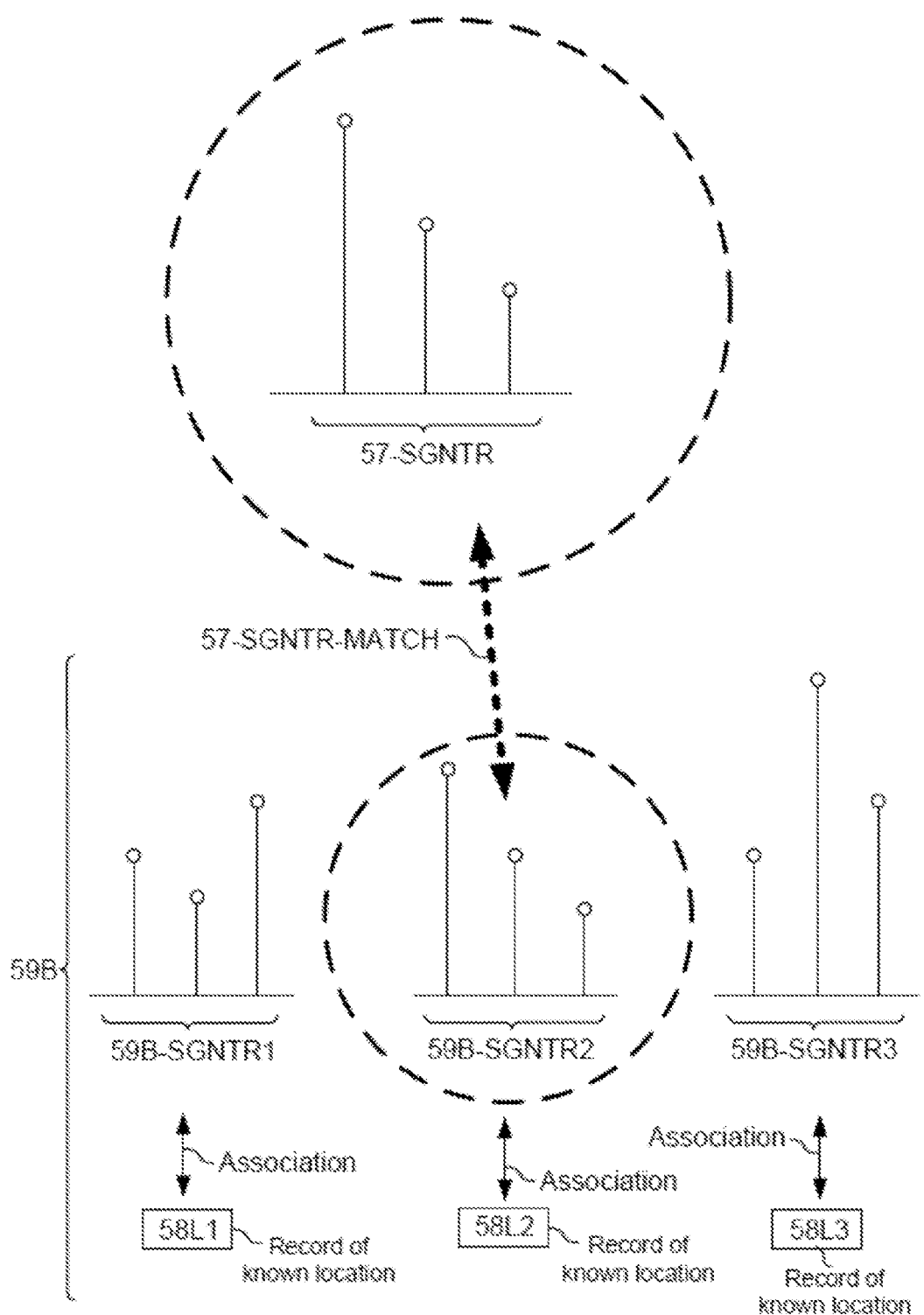
FIG. 4 illustrates one embodiment of matching the signature with a recorded signature from a bank of recorded signatures, wherein each recorded signature is associated with a known location.

FIG. 4 illustrates an embodiment of signature matching 57-SGNTR-MATCH operating on the signature 57-SGNTR and a recorded signature 59B-SGNTR2 from a bank 59B of recorded signatures 59B-SGNTR1, 59B-SGNTR2, 59B-SGNTR3, wherein the recorded signal signatures are associated respectively with known locations 58L1, 58L2, 58L3. In one example, the received signal signature 57-SGNTR is compared to the stored signal signatures. In another example, the received signature is subtracted from the stored signatures (or vice versa). In another example, the received and stored signatures are convolved with one another. Those skilled in the art would appreciate that these or others (or combinations thereof) may be used as part of the signature matching process of the present system and method.

Figure 5:
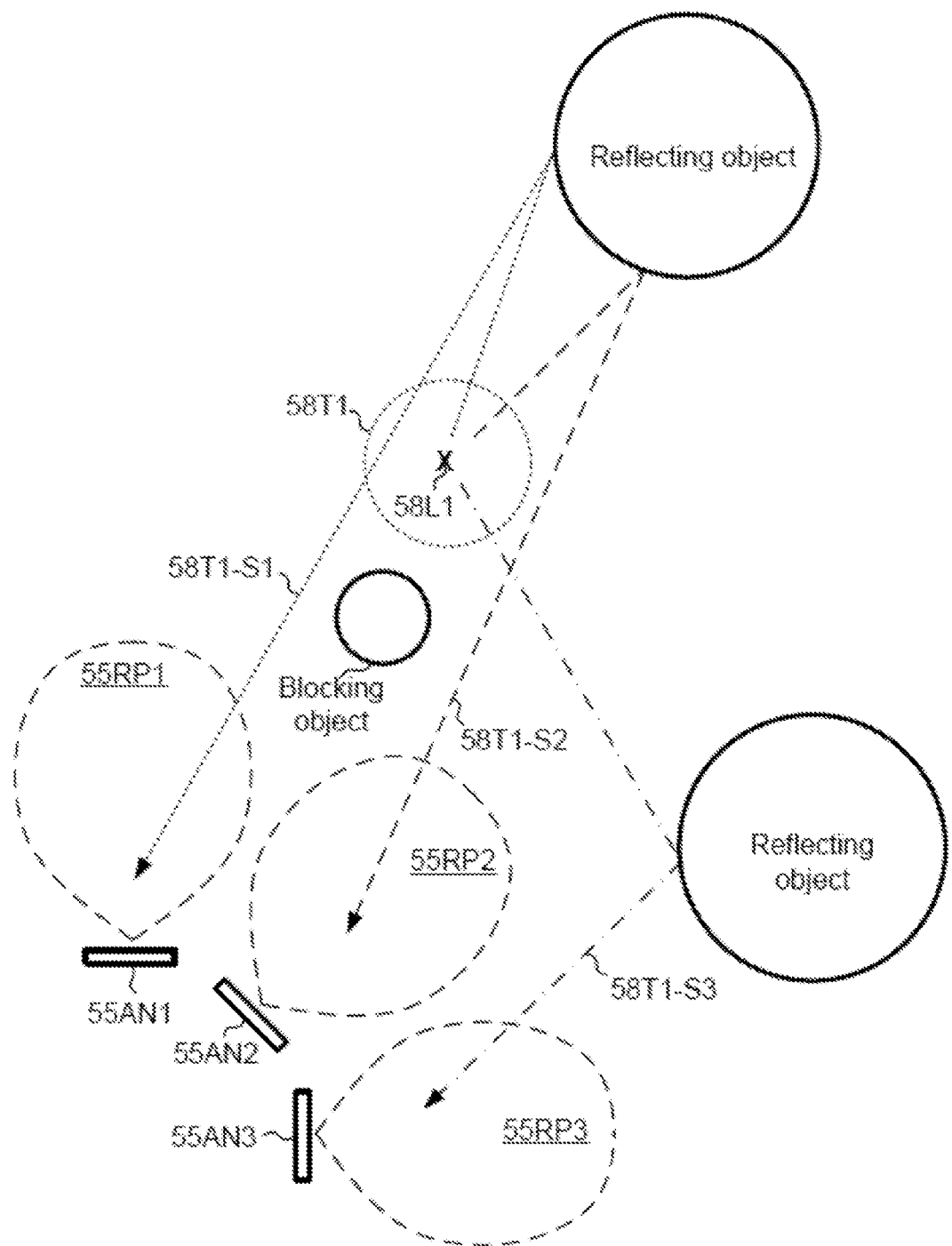
FIG. 5 illustrates one embodiment of the system including the first, second, and third receive antenna configuration, receiving location-specific wireless signals from a first known location.

FIG. 5 illustrates an embodiment of the system having a first receive antenna 55AN1, second receive antenna 55AN2, and third receive antenna 55AN3 configuration, receiving location-specific wireless signals 58T1-S1, 58T1-S2, 58T1-S3 from a transmitter (e.g., client device) 58T1 at a first known location 58L1. A blocking object between transmitter 58T1 and receivers 55ANx may block the reception of one or more signal paths in the environment.

Figure 6:
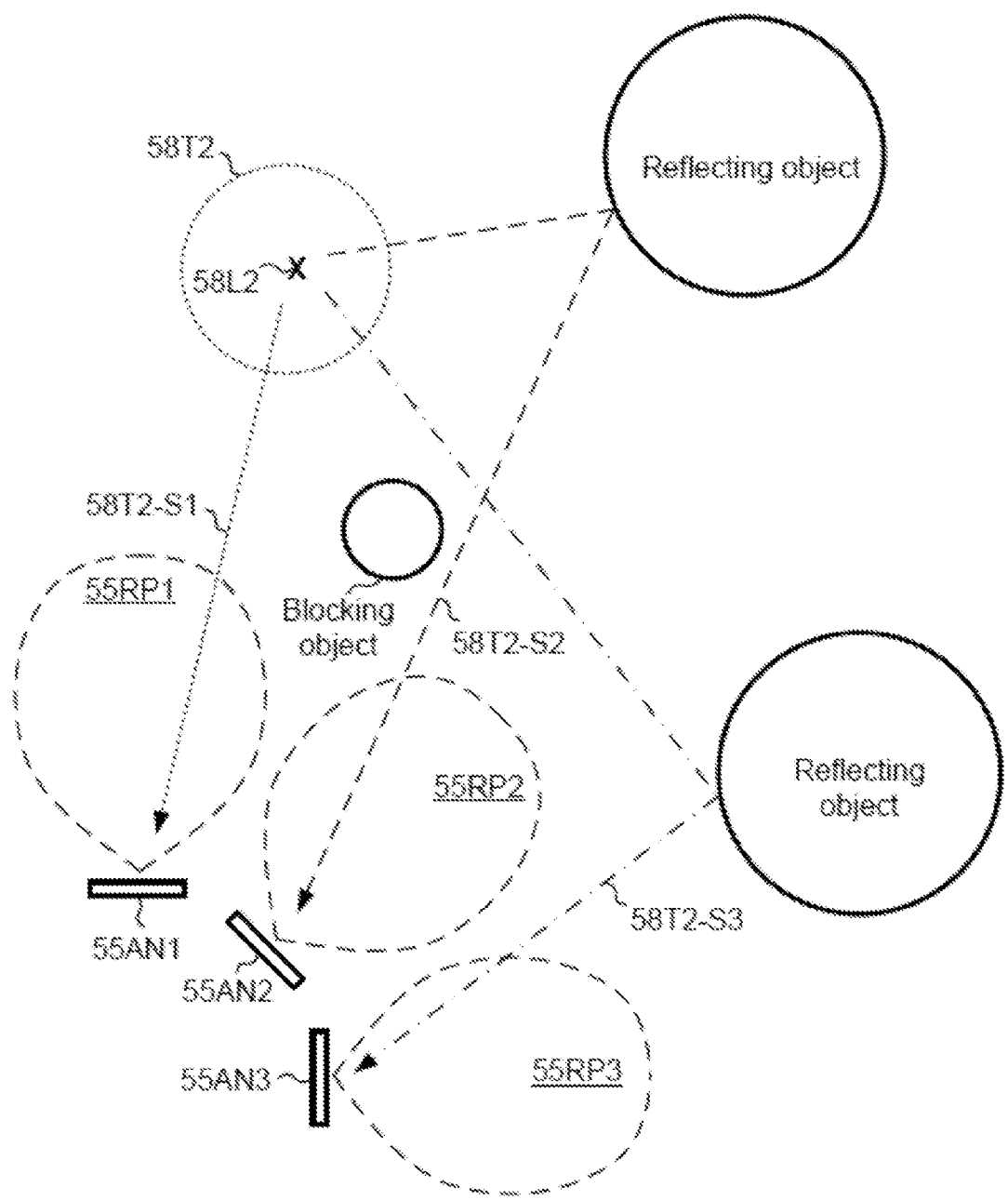
FIG. 6 illustrates one embodiment of the system including the first, second, and third receive antenna configuration, receiving location-specific wireless signals from a second known location.

FIG. 6 illustrates an embodiment of the system including a first 55AN1, second 55AN2, and third 55AN3 receive antenna configuration, receiving location-specific wireless signals 58T2-S1, 58T2-S2, 58T2-S3 from a second known location 58L2. It is to be understood that single reflections and/or multiple reflections can occur to a signal transmitted over the air in the environment of the system.

Figure 7:
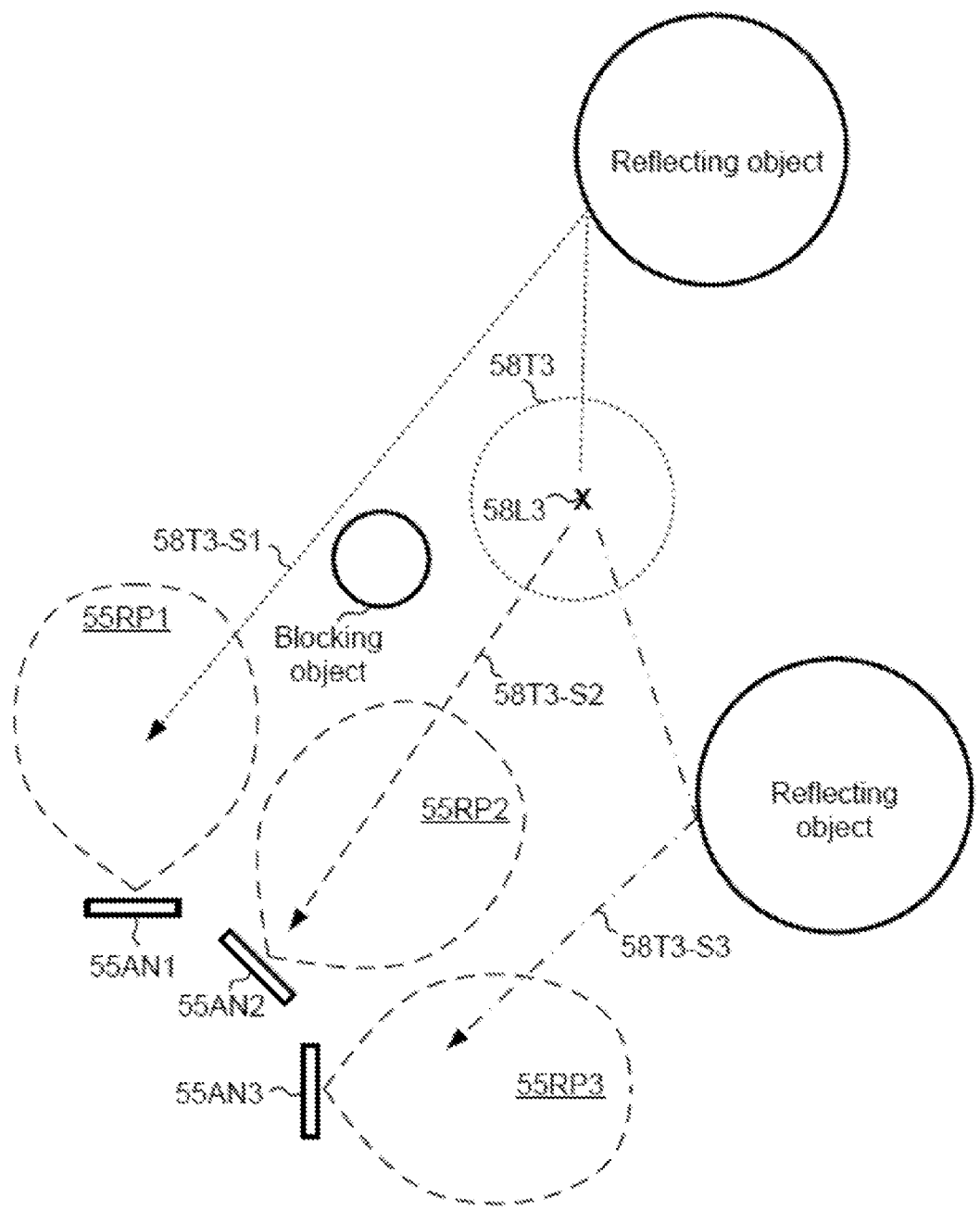
FIG. 7 illustrates one embodiment of the system including the first, second, and third receive antenna configuration, receiving location-specific wireless signals from a third known location.
Figure 8:
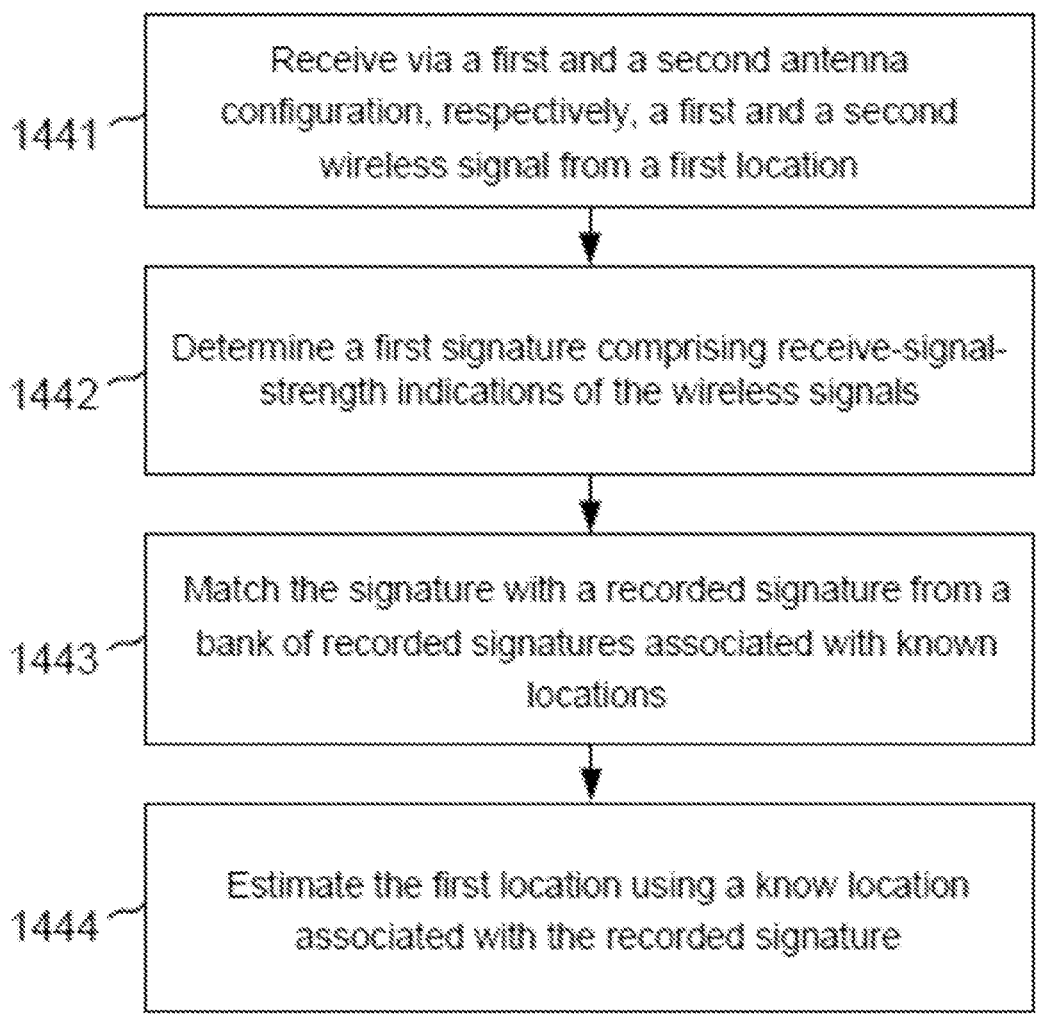
FIG. 8 illustrates one embodiment of a method for estimating location of a wireless client device.

FIG. 7 illustrates an embodiment of the system including a first receive antenna 55AN1, second receive antenna 55AN2, and third receive antenna 55AN3 configuration, receiving location-specific wireless signals 58T3-S1, 58T3-S2, 58T3-S3 from a third known location 58L3. Again, one or more blocking objects and/or reflecting objects in the environment can affect the specific signal signatures experienced by receive antennas 55ANx.

In an aspect, the present system and method is adapted for estimating a location of a wireless client device. The system is configured and arranged for receiving, via at least a set of receive antenna configuration (e.g., 55AN1, 55AN2, etc.) of a first receiver 56SYS, respectively, at least a first 57T1-S1 and a second 57T1-S2 wireless signal associated with at least one transmission 57T1 transmitted by a wireless client device 57CD1 from a first location 57L1. The system and method is adapted for determining a first signature 57-SGNTR that includes at least a first 57T1-S1-RSSI and a second 57T1-S2-RSSI received-signal-strength-indication associated respectively with said at least first 57T1-S1 and second 57T1-S2 wireless signal. The system and method is further adapted for signal matching 57-SGNTR-MATCH between said first signature 57-SGNTR and at least one recorded signature 59B-SGNTR2 taken from a bank 59B of recorded signatures 59B-SGNTR1, 59B-SGNTR2, 59B-SGNTR3 previously obtained via said at least first and second receive antenna configuration in conjunction with previous transmissions 58T1, 58T2, 58T3 transmitted from known locations 58L1, 58L2, 58L3 respectively. In addition, the system and method is adapted for estimating said first location 57L1, using at least one 58L2 of said known locations that is associated, in said bank, with said at least one recorded signature 59B-SGNTR2. In an aspect, the system and method are adapted to operate on spatial signal signatures that are received over the air at multiple receiving antenna receivers operating in concert and coupled to a processing circuit that analyzes the received signals from each of said receiving antennas so as to generate a received signal signature. A memory or digital data store coupled to said processor is used to store the stored spatial signal signatures to which the received signature is matched or compared. Those skilled in the art will understand that a match quality criterion or criteria may be imposed so as to set a threshold of acceptability to the obtained matches.

Another embodiment includes populating said bank of recorded signal signatures, prior to said receiving action, wherein said populating action includes receiving, from each of a plurality of said known locations 58L1, 58L2, 58L3, per each such known location via said at least first 55AN1 and second 55AN2 receive antenna configuration, respectively, at least a first 58T1-S1, 58T2-S1, 58T3-S1 location-specific and a second 58T1-S2, 58T2-S2, 58T3-S2 location-specific wireless signal associated with said known location 58L1, 58L2, 58L3; determining, for each of said known locations 58L1, 58L2, 58L3, a location-specific signature 59B-SGNTR1, 59B-SGNTR2, 59B-SGNTR3 respectively, each such location-specific signature includes at least a first location-specific and a second location-specific received-signal-strength-indication associated respectively with said at least first location-specific and second location-specific wireless signal; and recording, in said bank 59B, for each of said known locations 58L1, 58L2, 58L3, said location-specific signature 59B-SGNTR1, 59B-SGNTR2, 59B-SGNTR3 associated therewith.

In one embodiment, said first signature 57-SGNTR further includes additional received-signal-strength-indications 57T1-S3-RSSI associated respectively with additional 57T1-S3 wireless signals received respectively via additional 55AN3 receive antenna configurations in association with said at least one transmission 57T1; and each of said recorded signatures 59B-SGNTR1, 59B-SGNTR2, 59B-SGNTR3 in said bank 59B were previously obtained via said at least first 55AN1 and second 55AN2 receive antenna configuration and said additional 55AN3 receive antenna configurations in conjunction with said previous transmissions 58T1, 58T2, 58T3 transmitted from said known locations 58L1, 58L2, 58L3.

In one embodiment, N of said receive antenna configurations are involved in determining of said first signature 57-SGNTR and recorded signatures 59B-SGNTR1, 59B-SGNTR2, 59B-SGNTR3, such that said matching action 57-SGNTR-MATCH includes an N-dimensional matching action, and wherein N is equal to at least four (4) and at most sixteen (16).

In one embodiment, each of said N receive antenna configurations 55AN1, 55AN2, 55AN3 is associated with a unique radiation pattern 55RP1, 55RP2, 55RP3, thereby statistically assuring that each of said known locations 58L1, 58L2, 58L3 is associated with a unique signature 59B-SGNTR1, 59B-SGNTR2, 59B-SGNTR3, thereby facilitating an accuracy of at least 10 meters in association with said estimating of said first location 57L1.

In one embodiment, said first receive antenna configuration 55AN1 is associated with a first radiation pattern 55RP1, and said second receive antenna configuration 55AN2 is associated with a second radiation pattern 55RP2 that is substantially different than said first radiation pattern 55RP1 in terms of angular coverage, thereby statistically assuring that said first received-signal-strength-indication 57T1-S1-RSSI and said second received-signal-strength-indication 57T1-S2-RSSI are substantially uncorrelated, thereby facilitating said matching action 57-SGNTR-MATCH.

In one embodiment, said first receive antenna configuration 55AN1 comprises a first directional antenna directed to a first direction, and said second receive antenna configuration 55AN2 is a second directional antenna directed to a second direction different than said first direction, thereby facilitating said difference between said first 55RP1 and second 55RP2 radiation patterns.

In one embodiment, said at least one transmission 57T1 comprises a single wireless packet.

In one embodiment, said first receiver 56SYS comprises a WiFi access-point, and said single wireless packet is WiFi wireless packet.

In one embodiment, said at least one transmission 57T1 comprises a first wireless packet and a second wireless packet, such that said first wireless packet is received via said first receive antenna configuration 55AN1 as the first wireless signal 57T1-S1, and said second wireless packet is received via said second receive antenna configuration 55AN2 as the second wireless signal 57T1-S2.

One embodiment includes detecting a first and a second wireless propagation delay associated respectively with said first 57T1-S1 and second 57T1-S2 wireless signal, wherein said first signature 57-SGNTR further includes said first and second wireless propagation delay; and each of said recorded signatures 59B-SGNTR1, 59B-SGNTR2, 59B-SGNTR3 in said bank 59B includes wireless propagation delays previously obtained via said at least first 55AN1 and second 55AN2 receive antenna configuration in conjunction with said previous transmissions 58T1, 58T2, 58T3 transmitted from said known locations 58L1, 58L2, 58L3.

One embodiment includes receiving, via said at least first 55AN1 and second 55AN2 receive antenna configuration, respectively, at least a third and a fourth wireless signal associated with at least one other transmission, transmitted by said wireless client device 57CD1, at a different frequency than said at least one transmission 57T1, from said first location 57L1, wherein said first signature 57-SGNTR further includes at least a third and a fourth received-signal-strength-indication associated respectively with said at least third and fourth wireless signal.

One embodiment is a method for estimating location of a wireless client device.

Step 1441 comprises receiving, via at least a first 55AN1 and a second 55AN2 receive antenna configuration of a first receiver 56SYS, respectively, at least a first 57T1-S1 and a second 57T1-S2 wireless signal associated with at least one transmission 57T1 transmitted by a wireless client device 57CD1 from a first location 57L1.

Step 1442 comprises determining a first signature 57-SGNTR that includes at least a first 57T1-S1-RSSI and a second 57T1-S2-RSSI received-signal-strength-indication associated respectively with said at least first 57T1-S1 and second 57T1-S2 wireless signal.

Step 1443 comprises matching 57-SGNTR-MATCH said first signature 57-SGNTR with at least one recorded signature 59B-SGNTR2 taken from a bank 59B of recorded signatures 59B-SGNTR1, 59B-SGNTR2, 59B-SGNTR3 previously obtained via said at least first and second receive antenna configuration in conjunction with previous transmissions 58T1, 58T2, 58T3 transmitted from known locations 58L1, 58L2, 58L3 respectively.

Step 1444 comprises estimating said first location 57L1, using at least one 58L2 of said known locations that is associated, in said bank, with said at least one recorded signature 59B-SGNTR2.

In one embodiment, a received-signal-strength-indication, such as said first 57T1-S1-RSSI received-signal-strength-indication, is determined by performing time domain power averaging on signals such as first 57T1-S1 wireless signal.

In one embodiment, a received-signal-strength-indication, such as said first 57T1-S1-RSSI received-signal-strength-indication, is determined by performing frequency domain power averaging on signals such as first 57T1-S1 wireless signal.

In one embodiment, a received-signal-strength-indication, such as said first 57T1-S1-RSSI received-signal-strength-indication, is determined by performing either a time domain power averaging or frequency domain power averaging on a filtered version of signals such as first 57T1-S1 wireless signal. In one embodiment, said filtered version is obtained by filtering signals such as first 57T1-S1 wireless signal using a low-pass filter. In one embodiment, said low-pass filter is a 20 Mhz low-pass filter. In one embodiment, said low-pass filter is a 40 Mhz low-pass filter.

In one embodiment, a received-signal-strength-indication, such as said first 57T1-S1-RSSI received-signal-strength-indication, is determined by correlating signals, such as first 57T1-S1 wireless signal, with a predetermined pattern or reference signal.

In one embodiment, a received-signal-strength-indication, such as said first 57T1-S1-RSSI received-signal-strength-indication, is determined by performing any operation associated with power or energy measurement, on signals such as first 57T1-S1 wireless signal.

Figure 9:
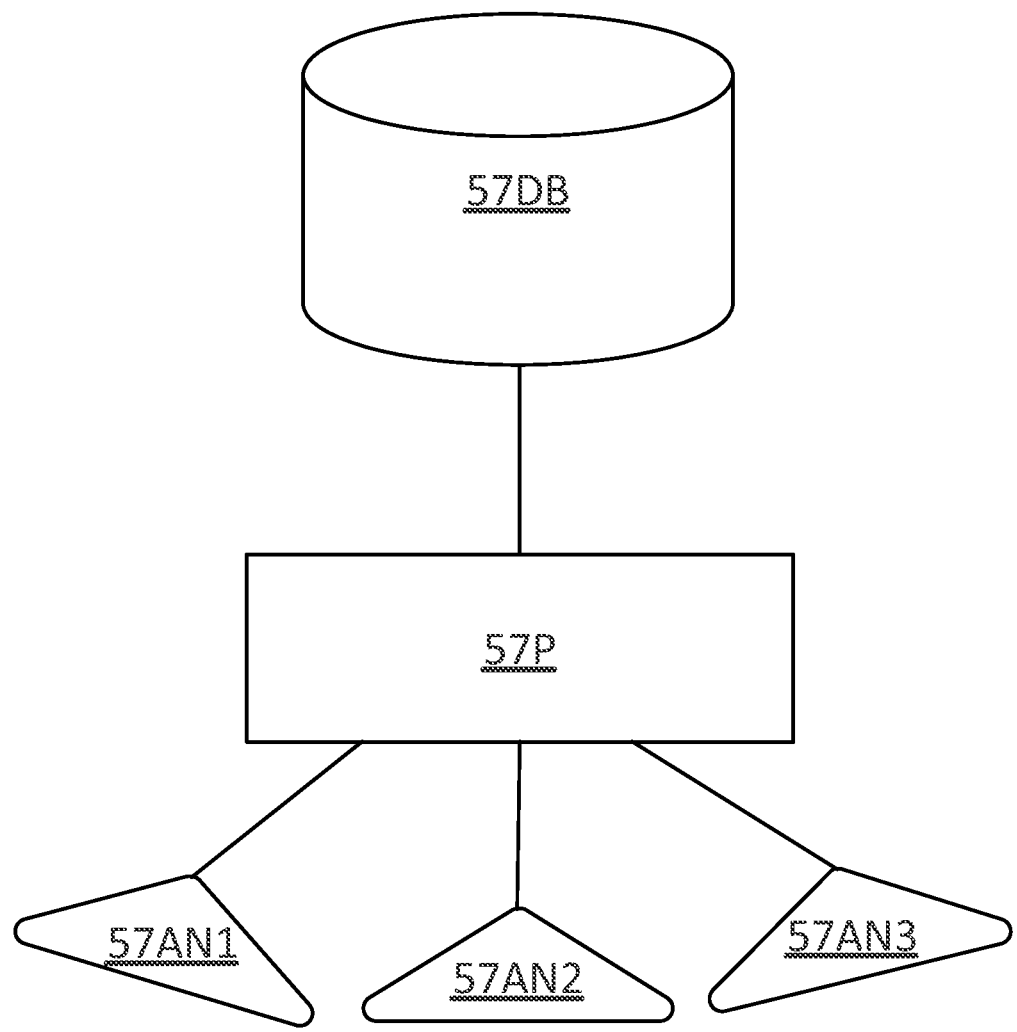
FIG. 9 illustrates an exemplary block diagram of a system comprising a processor coupled to a plurality of receiver signals and a data store of stored signal signatures.

FIG. 9 illustrates a block diagram of a system comprising a processor 57P as described above, which is adapted and arranged for receiving signals representing received wireless signals from a plurality of receive antennas 57ANx. The processor 57P is further adapted and arranged to determine at least one signal signature derived from the received signals. The processor 57P is additionally coupled to storage unit or database 57DB, which may be a memory co-located with or remote from processor 57P, so that processor 57P may take and match said received signal signature to one or more stored signal signatures kept in database or storage unit 57DB. As mentioned above, the matching can be based on a number of criteria for comparing the received signal signature with the stored signatures, which generally relate to a spatial signature for a transmitting device. In an aspect, the received signal signature is compared with and matched to one of a plurality of stored signatures in a bank of stored signatures, which at least one stored signature is associated with a location of the transmitting device.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "an embodiment" "an aspect" "one embodiment" and "one case", etc. mean that the feature being referred to may be included in at least one embodiment/case of the invention.

Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams.

Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements.

While the methods disclosed herein have been described and shown with reference to particular steps performed in a particular order, it is understood that these steps may be combined, sub-divided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. It is intended that the present disclosure embrace all such alternatives, modifications and variations that fall within the spirit and scope of the appended claims and their equivalents.

What is claimed is:

1. A method for estimating location of a wireless client device, comprising:
   receiving, via at least a first and a second receive antenna configuration of a first receiver, respectively, at least a first and a second wireless signal associated with at least one transmission transmitted by a wireless client device from a first location;
   determining a first signature comprising at least a first and a second received-signal-strength-indication associated respectively with said at least first and second wireless signal;
   matching said first signature with at least one recorded signature taken from a bank of recorded signatures previously obtained via said at least first and second receive antenna configuration in conjunction with previous transmissions transmitted from known locations;
   estimating said first location, using said matching, with at least one of said known locations that is associated, in said bank, with said at least one recorded signature; and
   populating said bank of recorded signatures, prior to said receiving action, wherein said populating action comprises:
   receiving, from each of a plurality of said known locations, via said at least first and second receive antenna configuration, respectively, at least a first location-specific and a second location-specific wireless signal associated with said known location;
   determining, for each of said known locations, a location-specific signature comprising at least a first location-specific and a second location-specific received-signal-strength-indication associated respectively with said at least first location-specific and second location-specific wireless signal; and
   recording, in said bank, for each of said known locations, said location-specific signature associated therewith.

2. The method of claim 1, wherein:
   said first signature further comprises additional received-signal-strength-indications associated respectively with additional wireless signals received respectively via additional receive antenna configurations in association with said at least one transmission; and
   each of said recorded signatures in said bank were previously obtained via said at least first and second receive antenna configuration and said additional receive antenna configurations in conjunction with said previous transmissions transmitted from said known locations.

3. The method of claim 2, wherein N of said receive antenna configurations are involved in determining of said first signature and recorded signatures, such that said matching action comprises an N-dimensional matching action, and wherein N is equal to at least four (4) and at most sixteen (16).

4. The method of claim 3, wherein each of said N receive antenna configurations is associated with a unique radiation pattern, thereby statistically assuring that each of said known locations is associated with a unique signature, thereby facilitating an accuracy of at least 10 meters in association with said estimating of said first location.

5. The method of claim 1, wherein said first receive antenna configuration is associated with a first radiation pattern, and said second receive antenna configuration is associated with a second radiation pattern that is substantially different than said first radiation pattern in terms of angular coverage, thereby statistically assuring that said first received-signal-strength-indication and said second received-signal-strength-indication are substantially uncorrelated, thereby facilitating said matching action.

6. The method of claim 5, wherein said first receive antenna configuration is a first directional antenna directed to a first direction, and said second receive antenna configuration is a second directional antenna directed to a second direction different than said first direction, thereby facilitating said difference between said first and second radiation patterns.

7. The method of claim 1, wherein said at least one transmission is a single wireless packet.

8. The method of claim 7, wherein said first receiver is a WiFi access-point, and said single wireless packet is WiFi wireless packet.

9. The method of claim 1, wherein said at least one transmission comprises a first wireless packet and a second wireless packet, such that said first wireless packet is received via said first receive antenna configuration as the first wireless signal, and said second wireless packet is received via said second receive antenna configuration as the second wireless signal.

10. The method of claim 1, further comprising: detecting a first and a second wireless propagation delay associated respectively with said first and second wireless signal, wherein:
   said first signature further comprising said first and second wireless propagation delay; and
   each of said recorded signatures in said bank comprise wireless propagation delays previously obtained via said at least first and second receive antenna configuration in conjunction with said previous transmissions transmitted from said known locations.

11. The method of claim 1, further comprising: receiving, via said at least first and second receive antenna configuration, respectively, at least a third and a fourth wireless signal associated with at least one other transmission, transmitted by said wireless client device, at a different frequency than said at least one transmission, from said first location, and wherein said first signature further comprises at least a third and a fourth received-signal-strength-indication associated respectively with said at least third and fourth wireless signal.

* * * * *